US012688027B2

(12) United States Patent
Klepke et al.

(10) Patent No.: US 12,688,027 B2
(45) Date of Patent: Jul. 21, 2026

(54) ZERO-DOWNTIME UPGRADES OF CONTAINERIZED PROGRAMMABLE LOGIC CONTROLLER (PLC) AUTOMATION FUNCTIONS

(71) Applicant: Siemens Aktiengesellschaft, Munich (DE)

(72) Inventors: Steffen Klepke, Munich (DE); Christoph Stückjürgen, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 368 days.

(21) Appl. No.: 18/244,699

(22) Filed: Sep. 11, 2023

(65) Prior Publication Data

US 2024/0094698 A1     Mar. 21, 2024

(30) Foreign Application Priority Data

Sep. 16, 2022    (EP) ..................................... 22196153

(51) Int. Cl.
 *G06F 8/65* (2018.01)
 *G05B 19/05* (2006.01)

(52) U.S. Cl.
 CPC ............. *G06F 8/65* (2013.01); *G05B 19/056* (2013.01)

(58) Field of Classification Search
 None
 See application file for complete search history.

(56) References Cited

U.S. PATENT DOCUMENTS 11,269,620 B1 * 3/2022 Hoeft ...................... G06F 8/656
2015/0007159 A1 * 1/2015 Gebhard ................. G06F 11/36
717/171

(Continued)

FOREIGN PATENT DOCUMENTS

CN        111552496 B     7/2021
EP          4040243 A1    8/2022

OTHER PUBLICATIONS

Wikipedia: "Programmable Logic Controller". Aug. 8, 2022. URL: <https://en.wikipedia.org/wiki/Programmable_logic_controller> 14 Pages.

(Continued)

*Primary Examiner* — Qing Chen
(74) *Attorney, Agent, or Firm* — Schmeiser Olsen PLLC

(57)        ABSTRACT

Disclosed is an automated method and system for upgrading an automation function controlling an actuator via a PLC (programmable logic controller), including:
 providing a first container and a first sidecar container, whereby the first container contains a first automation function,
 the first automation function is controlling the actuator via the PLC,
 providing a second container and a second sidecar container, whereby the second container contains a second automation function,
 the second automation function is receiving data from the actuator but is not controlling the actuator,
 based on the received data pre-activation tests for the second automation function are executed in the second sidecar container by the second test unit,
 if the pre-activation tests are successfully finished, the time when the control of the actuator is handed over is determined, and (Continued)

the control of the actuator is handed over from the first automation function to the second automation function.

10 Claims, 3 Drawing Sheets

(56) References Cited

U.S. PATENT DOCUMENTS

| | | | | | |
|---|---|---|---|---|---|
| 2015/0192918 | A1* | 7/2015 | Obermeier | ............... | G06F 8/65 |
| | | | | | 700/87 |
| 2016/0162277 | A1* | 6/2016 | Fenzl | ..................... | G06F 8/656 |
| | | | | | 717/170 |
| 2017/0123787 | A1* | 5/2017 | Burkhardt | ................ | G06F 8/66 |
| 2018/0285097 | A1* | 10/2018 | Radermacher | ...... | G06F 16/2282 |
| 2020/0104111 | A1* | 4/2020 | Ronge | .................. | H04L 41/046 |

OTHER PUBLICATIONS

"What is a container?" Docker; Date Accessed: Aug. 23, 2023. URL: <https://www.docker.com/resources/what-container/> 10 Pages.

* cited by examiner

FIG 1

Phase 1

Automation Function 1.0
| Test unit | Upgrade unit | robot

Phase 2

Automation Function 1.0
| Test unit | Upgrade unit |

Coordination

| Test unit | Upgrade unit |
Automation Function 2.0 ⊗

Phase 3

Automation Function 1.0 ⊗
| Test unit | Upgrade unit |

Coordination

| Test unit | Upgrade unit |
Automation Function 2.0

Phase 4

| Test unit | Upgrade unit |
Automation Function 2.0

⊗ ~ muted

ZERO-DOWNTIME UPGRADES OF CONTAINERIZED PROGRAMMABLE LOGIC CONTROLLER (PLC) AUTOMATION FUNCTIONS

CROSS-REFERENCE TO RELATED APPLICATIONS

This application claims priority to EP Application No. 22196153.5, having a filing date of Sep. 16, 2022, the entire contents of which are hereby incorporated by reference.

FIELD OF TECHNOLOGY

The following relates to an automated method and a system for upgrading an automation function controlling an actuator via a PLC (programmable logic controller).

BACKGROUND

A PLC (in German: SPS—Speicher-programmierbare Steuerung) is a cyclic system that executes an automation function in a repeating way, e.g., every 100 milliseconds. The automation function implements an algorithm to control an actuator, e.g., a robot.

The PLC works in a program scan cycle (in short: PLC cycle), where it executes its program repeatedly. The simplest scan cycle consists of three steps:

read inputs, execute the program of the automation function, and write outputs.

The program follows the sequence of instructions. Depending on the complexity of the program, it typically takes time spans of some microseconds up to tens of milliseconds for the processor to evaluate all the instructions and update the status of all outputs.

More details about the functionality of a PLC are for example disclosed in: en.wikipedia.org/wiki/Programmable_logic_controller.

As an example, the automation function receives sensor information about the current position of a robot arm through the PLC every 100 ms. Based on the sensor data the automation function calculates the next position for the robot arm and sends this information to the robot via the PLC (every 100 ms).

If the automation function needs to be upgraded, e.g., to implement a new motion profile for the robot following steps are typically executed:

The logic of the automation function needs to be upgraded (textual or visual programming)

The running automation function needs to be stopped

The upgraded automation function needs to be deployed

The deployed automation function needs to be started.

A solution to overcome this problem is disclosed in the European Patent Application EP 4040243 A1. EP 4040243 A1 discloses a computer-implemented method for upgrading at least one control function performed on a technical system, the technical system comprising a PLC and at least one actuator controlled by the PLC, wherein the control function is adapted to provide an output which controls the actuator, wherein the computer-implemented method is adapted to:

a. deploying at least one updated version of the control function on the system while maintaining the current version of the control function on the system, b. wherein the updated version is prevented from controlling the actuator, whereby the current version and the updated version publish their commands in each PLC cycle to a Publish/Subscribe communication module of the PLC additionally with an information about whether the published control command is a primary control command or a secondary control command, and c. in each PLC cycle passing the published control command, which is a primary control command to the actuator by the PLC, d. whereby the information of the published control command of the updated version changes to a primary control command and the published control command of the current version to a secondary control command in a mutual agreement process between the current version and the updated version.

In principle, a zero-downtime upgrade of an automation function comprises four phases:

Phase 1:

The current automation function (v1.0) is running. It receives sensor information through the PLC. Based on the sensor information it determines the values to be sent to the actuator through the PLC, e.g., to a robot.

In parallel an updated version of the automation function (v2.0) will be deployed by the operator of the robot arm. This updated version e.g., incorporates a new motion profile of the robot.

Phase 2:

Now, both versions of the automation function (v1.0 and v2.0) are running in parallel. The version v1.0 is controlling the robot—as described in phase 1. The version v2.0 already receives sensor information from the robot but does not control the robot yet.

Based on the sensor information pre-activation tests are performed within the automation function v2.0. Pre-activation tests verify that the automation function works as expected before it takes over real control of the robot. Pre-activation tests are implemented and executed in a dedicated test unit. A test unit in the context of the application is a software library, which needs to be incorporated by the automation function. The applicant implemented a test unit in the programming language C++.

In case the pre-activation tests are executed successfully the two parallel automation functions v1.0 and v2.0 are now coordinating among each other when to hand over the control of the robot from version 1.0 to version 2.0. The hand-over coordination is performed in a dedicated upgrade unit. The upgrade unit is a software library, which needs to be incorporated by the automation functions. The applicant implemented an upgrade unit in the programming language C++.

The upgrade units of automation functions v1.0 and v2.0 are communicating with each other via network protocol e.g., TCP/IP in order to align the hand-over of the control.

Phase 3:

The two automation functions v1.0 and v2.0 are handing over the control via the upgrade unit. Now, the automation function v2.0 is controlling the robot.

Health tests are executed in the automation function v2.0 to verify the automation function works as expected after it has taken over control. The health tests are implemented and executed in the test unit.

The automation function v1.0 still receives sensor data from the robot but does not control the robot anymore. It serves as a stand-by version in case health tests of v2.0 are failing.

In case the health tests are executed successfully the automation function v1.0 can be undeployed.

Phase 4:

The automation function v2.0 is running alone. The automation function v1.0 was undeployed.

The illustration of FIG. 1 outlines the approach of the above described four phases. For simplicity, the PLC is not shown in FIG. 1.

The test unit and the upgrade unit are implemented as a software library (currently in C++). Therefore, above-described approach is limited to automation functions which are implemented in the same programming language as the test unit and upgrade unit software library.

Moreover, the programming language versions of the test unit, the upgrade Unit and the automation function must be compatible. For example, a software library which uses elements from the C++ version 20 might not be compatible with an automation function or a software library which is implemented with C++ version 11.

Currently, the test unit and the upgrade unit for the purpose of zero-downtime upgrades are available as C++11 software library only.

To use the software library-based approach in automation functions which are implemented in different programming languages e.g., Rust or Java, the test unit and the upgrade unit must be implemented in other programming languages. This leads to developing and maintaining multiple software libraries, which provide the same functionality but in different programming languages.

SUMMARY

An aspect relates a solution for zero-downtime upgrades of automation functions for a PLC, whereby the solution minimizes developing and maintaining effort.

Embodiments of the invention refer to automation functions which are implemented in higher-level programming languages, such as C++. It does not cover automation functions implemented with PLC programming languages covered by standard IEC 611311. This standard describes a set of basic, PLC-specific visual and textual program instructions.

According to an aspect of embodiments of the invention a sidecar container as a second container is co-located to the application container. The automation function is provided in the application container and is able to communicate with the sidecar container. The sidecar container contains additional functionality which is not part of the application but useful for the application.

The following relates to an automated method for upgrading an automation function controlling an actuator via a PLC (programmable logic controller), comprising the steps:

a) providing a first container and a first sidecar container, whereby the first container contains a first automation function, and the first sidecar container contains a first test unit and a first upgrade unit, whereby the first automation function is configured to communicate with the first sidecar container, b) the first automation function is controlling the actuator via the PLC, c) providing a second container and a second sidecar container, whereby the second container contains a second automation function, and the second sidecar container contains a second test unit and a second upgrade unit, whereby the second automation function is configured to communicate with the second sidecar container, d) the second automation function is receiving data from the actuator but is not controlling the actuator, e) based on the received data pre-activation tests for the second automation function are executed in the second sidecar container by the second test unit, f) if the pre-activation tests are successfully finished, the time when the control of the actuator is handed over from the first automation function to the second automation function is determined through negotiation between the first upgrade unit and the second upgrade unit, and g) the control of the actuator is handed over from the first automation function to the second automation function.

In a further embodiment the method comprises the further steps:

h) health tests are performed for the second automation function by the second test unit, whereby the second automation function shares its internal data with the second sidecar container, and i) the first automation function is receiving data from the actuator through the PLC but is not controlling the actuator.

The first automation function serves as a stand-by version in case the health-test of the second automation function fails.

In a further embodiment the method comprises the further step:

j) the second automation function and the second sidecar container are running alone, whereas the first container including the first automation function, and the first sidecar container is undeployed.

In a further embodiment of the method the received data are sensor data from the actuator.

In a further embodiment of the method the first upgrade unit and the second upgrade unit communicate with each other via a network protocol.

In a further embodiment of the method the network protocol is TCP/IP.

In a further embodiment of the method the first and second test unit contains a software-library configured and programmed to test the functionality of the first and second application function, respectively.

In a further embodiment of the method the first and second upgrade unit contains a software-library configured and programmed to orchestrate the hand-over from the first to the second application function.

The following further relates to a system comprising at least one computational device configured and programmed to perform the inventive method.

In a further embodiment of the system the actuator is a robot.

The disclosed solution has many advantages and benefits. Without the disclosed solution, an automation function using Zero Downtime Upgrade must be implemented in the same language as the upgrade unit and the test unit, currently C++11. When using the solution, the automation function can be implemented in any programming language of any version, as long as the programming language offers the possibility to communicate with the upgrade unit and the test unit in the sidecar container.

A development team responsible for an automation function can choose the programming language according to their skills and the problem to be solved. Development efficiency is increased, development cost reduced and time to market improved.

Instead of linking an automation function with the upgrade unit and the test unit, both are deployed in the sidecar container. Coupling between automation function and upgrade and test unit is established only via a communication protocol instead of library function calls.

The zero-downtime upgrade approach helps to reduce downtime of industrial systems. It helps to achieve higher release frequency of software updates (=faster time to market).

The disclosed solution increases the attractiveness of Control Products towards customer development teams, since it releases development teams to use old programming languages. Many Siemens initiatives strive for making modern IT-approaches and technologies available within the OT (Operations Technology) world—to achieve a higher attractiveness of OT products (like PLCs) towards customers. The containerized zero-down-time approach is one approach and reusable building block within such initiatives.

With the disclosed solution more (Siemens) industrial systems can make use of the zero-downtime upgrade approach—independent in which programming language they are implemented. Otherwise only industrial systems implemented in C++ (version 11) can benefit (which is current state of the art, without embodiments of this invention). Thus, a development team responsible for an automation function can choose the programming language according to their skills and the problem to be solved. Development efficiency is increased, development cost reduced and time to market improved.

Further benefits and advantages of embodiments of the present invention will become apparent after a careful reading of the detailed description with appropriate reference to the accompanying drawings.

BRIEF DESCRIPTION

Some of the embodiments will be described in detail, with reference to the following figures, wherein like designations denote like members, wherein:

FIG. 1 shows a flow chart of a zero-downtime upgrade of an automation function according to state of the art;

DETAILED DESCRIPTION

The disclosed solution is based on the concepts of a container and a sidecar container.

According to www.docker.com/resources/what-container a [virtual] container is a standard unit of software that packages-up code and all its dependencies, so an application runs quickly and reliably from one computing environment to another.

A sidecar container is a second container which is co-located to the application container. The sidecar container contains additional functionality which is not part of the application but useful for the application. To use functionality from the sidecar container the application container and the sidecar container communicate via a network protocol, e.g., TCP/IP. Application container and sidecar container are deployed jointly. This means the communication between container and sidecar container is not going over a physical network connection, but over loopback interfaces of a single physical host.

Figure 2:
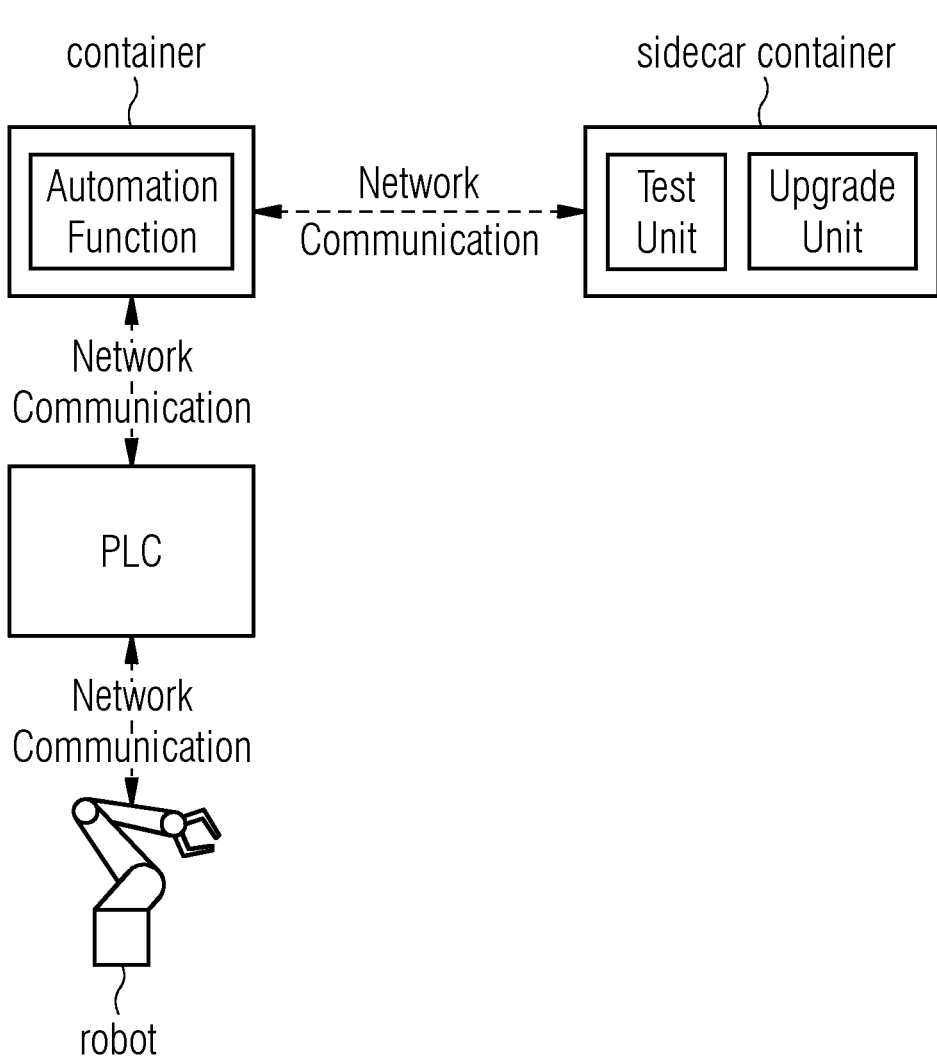
FIG. 2 shows the principle of container and sidecar container.

In the context of zero-downtime upgrades of PLC automation functions the automation function is packed in a container. The test unit and the upgrade unit are packed into a sidecar container—as depicted in the illustration of FIG. 2.

Compared to a software library approach, in a sidecar container approach the test unit and the upgrade unit are not integral part of the automation function anymore. Therefore, the sidecar container can be used for zero-downtime upgrades of automation functions implemented in arbitrary programming languages—as long as the automation function is provided in a container and is able to communicate with the sidecar container.

Figure 3:
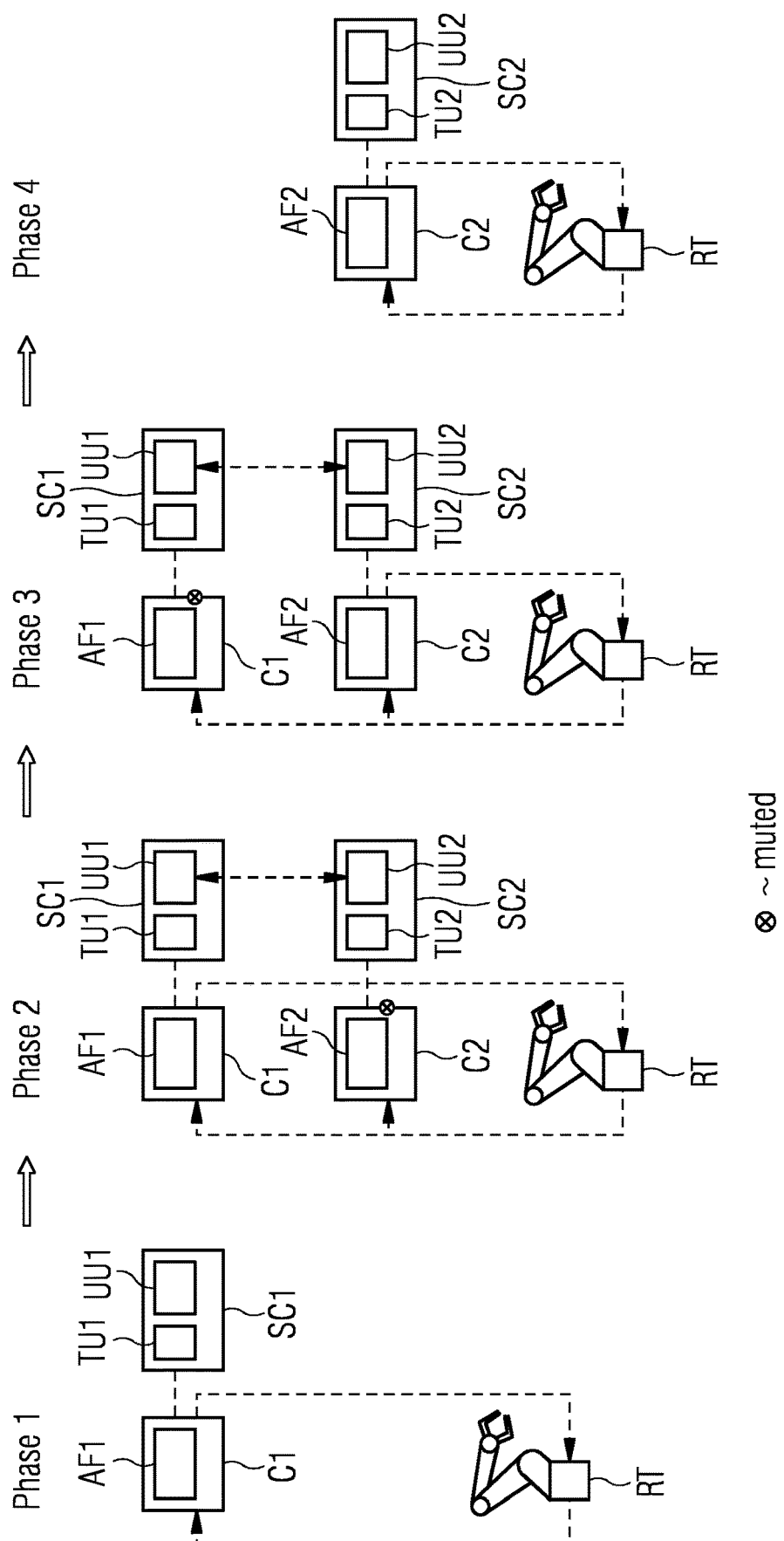
FIG. 3 shows a flow chart of the upgrade method in four phases.

The sidecar container-based zero-downtime upgrade of PLC automation functions still follows above described four phases of the upgrade process (illustrated in FIG. 1). The illustration of FIG. 3 outlines the approach with container and sidecar container. For simplicity, the PLC is not shown in the illustration.

Phase 1:

A first container C1 comprising the first automation function AF1 and its corresponding first sidecar container SC1 are deployed jointly. The first sidecar container SC1 comprises a first test unit TU1 and a first upgrade unit UU1. The first automation function AF1 receives sensor information through a PLC. Based on the sensor information it determines the values to be sent to a robot RT through the PLC. The robot RT is an example for any kind of actuator which can be controlled via network communication e.g., pumps, valves, motors, etc.

The first sidecar container SC1 in phase 1 does not yet provide functionality, since there is no upgraded automation function in parallel available yet.

Phase 2

A second container C2 comprising a second automation function AF2 and its corresponding second sidecar container SC2 are deployed jointly by the operator of the robot RT. The second sidecar container SC2 comprises a second test unit TU2 and a second upgrade unit UU2. The second automation function AF2 for example incorporates a new motion profile for the robot RT. In phase 2 the second automation function AF2 already receives sensor information from the robot RT but does not control the robot RT yet.

Based on the sensor information pre-activation tests are performed for the second automation function AF2—executed in the second sidecar container SC2 of the second automation function AF2. Therefore, the sensor information is shared between the second container C2 and the second sidecar container SC2 via network communication.

If pre-activation tests are successfully finished the first automation function AF1 and the second automation function AF2 align among each other when to hand over control. This alignment is performed through communication between the first and second upgrade units UU1 and UU2 located in the first and second sidecar containers SC1 and SC2, respectively.

Both, the first and second upgrade unit UU1, UU2 communicate with each other via network protocol e.g., TCP/IP. This is identical to the software library approach described above.

Phase 3:

The control of the robot RT is handed over from the first automation function AF1 to the second automation function AF2.

Health tests will be performed for the second automation function AF2 via the second test unit TU2 located in the second sidecar container SC2 of the second automation function AF2. Therefore, the second automation function AF2 shares its internal data, such as sensor information and actuator output, with the second sidecar container SC2 via network communication.

The first automation function AF1 still receives sensor information from the robot RT through the PLC but does not control the robot RT. It serves as a stand-by version in case the health-test of the second automation function AF2 fail.

Phase 4:

The second automation function AF2 including its second sidecar container SC2 is running alone. The first automation function AF1 including its first sidecar container SC1 is undeployed jointly.

The second sidecar container SC2 in this phase does not provide functionality since there is no upgraded automation function in parallel available.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

LIST OF REFERENCE SIGNS

AF1 first automation function
AF2 second automation function
C1 first container
C2 second container
SC1 first sidecar container
SC2 second sidecar container
TU1 first test unit
TU2 second test unit
UU1 first upgrade unit
UU2 second upgrade unit
RT robot

The invention claimed is:

1. An automated method for upgrading an automation function controlling an actuator via a programmable logic controller (PLC), comprising the steps:
   a) providing a first container and a first sidecar container, whereby the first container contains a first automation function, and the first sidecar container contains a first test unit and a first upgrade unit, and whereby the first automation function is configured to communicate with the first sidecar container,
   b) the first automation function is controlling the actuator via the PLC,
   c) providing a second container and a second sidecar container, whereby the second container contains a second automation function, and the second sidecar container contains a second test unit and a second upgrade unit, whereby the second automation function is configured to communicate with the second sidecar container, and whereby the second container is different than the first container and the second sidecar container is different than the first sidecar container,
   d) the second automation function is receiving data from the actuator through the PLC but is not controlling the actuator via the PLC,
   e) based on the received data from the actuator, pre-activation tests for the second automation function are executed in the second sidecar container by the second test unit,
   f) if the pre-activation tests are successfully finished, a time when the control of the actuator is handed over from the first automation function to the second automation function is determined through negotiation between the first upgrade unit and the second upgrade unit, and
   g) the control of the actuator is handed over from the first automation function to the second automation function at the determined negotiated time.

2. The automated method according to claim 1, comprising the further steps:
   h) health tests are performed for the second automation function by the second test unit, whereby the second automation function shares its internal data with the second sidecar container, and
   i) the first automation function is receiving data from the actuator through the PLC but is not controlling the actuator via the PLC.

3. The automated method according to claim 2, comprising the further step:
   j) the second automation function and the second sidecar container are running alone, whereas the first container containing the first automation function, and the first sidecar container are undeployed.

4. The automated method according to claim 1, whereby the received data are sensor data from the actuator.

5. The automated method according to claim 1, whereby the first upgrade unit and the second upgrade unit communicate with each other via a network protocol.

6. The automated method according to claim 5, whereby the network protocol is TCP/IP.

7. The automated method according to claim 1, whereby the first and second test units contain a software library configured and programmed to test a functionality of the first and second automation functions, respectively.

8. The automated method according to claim 1, whereby the first and second upgrade units contain a software library configured and programmed to orchestrate the hand-over from the first automation function to the second automation function.

9. A system comprising at least one computational hardware device configured and programmed to perform the automated method according to claim 1.

10. The system according to claim 9, whereby the actuator is a robot.

* * * * *